United States Patent
He et al.

(10) Patent No.: US 10,075,634 B2
(45) Date of Patent: Sep. 11, 2018

(54) METHOD AND SYSTEM FOR GENERATING A SURROUND VIEW

(71) Applicants: Jia He, Shanghai (CN); Norman Weyrich, Shanghai (CN)

(72) Inventors: Jia He, Shanghai (CN); Norman Weyrich, Shanghai (CN)

(73) Assignee: Harman International Industries, Incorporated, Stamford, CT (US)

( * ) Notice: Subject to any disclaimer, the term of this patent is extended or adjusted under 35 U.S.C. 154(b) by 407 days.

(21) Appl. No.: 14/655,685

(22) PCT Filed: Dec. 26, 2012

(86) PCT No.: PCT/CN2012/087468
§ 371 (c)(1),
(2) Date: Jun. 25, 2015

(87) PCT Pub. No.: WO2014/100985
PCT Pub. Date: Jul. 3, 2014

(65) Prior Publication Data
US 2015/0334301 A1 Nov. 19, 2015

(51) Int. Cl.
*H04N 5/232* (2006.01)
*G06T 3/40* (2006.01)
(Continued)

(52) U.S. Cl.
CPC ....... *H04N 5/23238* (2013.01); *G06T 3/4038* (2013.01); *G06T 5/006* (2013.01);
(Continued)

(58) Field of Classification Search
None
See application file for complete search history.

(56) References Cited

U.S. PATENT DOCUMENTS 7,035,479 B2 * 4/2006 Coffland .......... G08B 13/19626
345/668
2005/0206659 A1 * 9/2005 Cutler .................. G03B 37/00
345/660
(Continued)

FOREIGN PATENT DOCUMENTS

CN 101079151 A 11/2007
CN 101354790 A 1/2009
(Continued)

OTHER PUBLICATIONS

European Patent Office, Extended European Search Report Issued in Application No. 12890723.5, dated Oct. 10, 2016, Germany, 8 pages.
(Continued)

*Primary Examiner* — Joseph Ustaris
*Assistant Examiner* — William Adrovel
(74) *Attorney, Agent, or Firm* — McCoy Russell LLP

(57) ABSTRACT

A method and system for generating a surround view are provided. The method may include: establishing a surround surface; obtaining a plurality of images of surroundings; and projecting the images onto the surround surface based on a projection relationship between points on the surround surface and pixels on the images to generate a surround view, where the projection relationship may change with heights of the points on the surround surface. An improved projection effect may be obtained.

14 Claims, 9 Drawing Sheets

(51) Int. Cl.
*G06T 5/00* (2006.01)
*G08G 1/16* (2006.01)
*B60R 11/00* (2006.01)
*H04N 13/02* (2006.01)

(52) U.S. Cl.
CPC ..... *B60R 2011/004* (2013.01); *B60R 2300/00* (2013.01); *B60R 2300/30* (2013.01); *B60R 2300/303* (2013.01); *B60R 2300/306* (2013.01); *B60R 2300/402* (2013.01); *B60R 2300/60* (2013.01); *B60R 2300/602* (2013.01); *B60R 2300/607* (2013.01); *G06T 2207/30248* (2013.01); *G08G 1/168* (2013.01); *H04N 13/0242* (2013.01); *H04N 13/0282* (2013.01)

(56) References Cited

U.S. PATENT DOCUMENTS

| | | |
|---|---|---|
| 2008/0181488 A1 | 7/2008 | Ishii et al. |
| 2008/0253606 A1 | 10/2008 | Fujimaki et al. |
| 2009/0322878 A1* | 12/2009 | Ishii .......... B60R 1/00 348/148 |
| 2011/0001826 A1 | 1/2011 | Hongo |
| 2012/0262580 A1* | 10/2012 | Huebner ........ B60R 1/00 348/148 |
| 2012/0287232 A1* | 11/2012 | Natroshvili ........ G06T 7/33 348/36 |

FOREIGN PATENT DOCUMENTS

| | | |
|---|---|---|
| CN | 102236790 A | 11/2011 |
| CN | 102842127 A | 12/2012 |
| EP | 1783684 A1 | 5/2007 |
| EP | 1990674 A1 | 11/2008 |
| EP | 2254334 A1 | 11/2010 |
| EP | 2523163 A1 | 11/2012 |

OTHER PUBLICATIONS

ISA State Intellectual Property Office of the P.R. China, International Search Report Issued in Patent Application No. PCT/CN2012/087468, dated Oct. 3, 2013, WIPO, 2 pages.

Cai, J. et al., "Mathematical Model for the System Calibration of Digital Camera," Mathematics in Practice and Theory, vol. 40, No. 14, Jul. 2010, 9 pages. (See p. 1, English Abstract).

State Intellectual Property Office of the People's Republic of China, Office Action and Search Report Issued in Application No. 201280077896.2, dated Mar. 27, 2017, 11 pages. (Submitted with Partial Translation).

* cited by examiner

METHOD AND SYSTEM FOR GENERATING A SURROUND VIEW

CROSS REFERENCE TO RELATED APPLICATION

The present application is a U.S. National Phase of International Patent Application Serial No. PCT/CN2012/087468, entitled "METHOD AND SYSTEM FOR GENERATING A SURROUND VIEW," filed on Dec. 26, 2012, the entire contents of which are hereby incorporated by reference for all purposes.

TECHNICAL FIELD

The present disclosure generally relates to a method and a system for generating a surround view.

BACKGROUND

Nowadays, 3D surround views are used more and more widely in driving assistant systems, especially in parking assistant systems. Currently, there are solutions projecting images showing scenery surrounding a vehicle onto a simulated 3D curved surface (surround surface). The surround surface may be configured to have a predetermined shape. To obtain information of such solutions, please refer to US Patent Publication No. 2012/0262580 A1. However, image distortions may occur in such solutions. Therefore, there is a need to provide a more robust method and system for generating a surround view.

SUMMARY

According to one embodiment of the present disclosure, a method for generating a surround view is provided. The method may include: establishing a surround surface; obtaining a plurality of images of surroundings; and projecting the images onto the surround surface based on a projection relationship between points on the surround surface and pixels on the images to generate a surround view, where the projection relationship may change with heights of the points on the surround surface. The height of a point means a distance from the point to a bottom surface, or a lowest tangent plane of the surround surface.

In some embodiments, the projection relationship between one of the images and the surround surface may be obtained based on Equation (3):

$$\begin{bmatrix} X_c \\ Y_c \\ Z_c \end{bmatrix} = R \begin{bmatrix} X_w \\ Y_w \\ Z_w \end{bmatrix} + WT \qquad \text{Equation (3)}$$

where $X_w$, $Y_w$, and $Z_w$ are world coordinates of a point on the surround surface in a world coordinate system, $X_c$, $Y_c$ and $Z_c$ are camera coordinates of the point in a camera coordinate system corresponding to the image, R stands for a rotation matrix from the world coordinate system to the camera coordinate system, T stands for a translation matrix from the world coordinate system to the camera coordinate system, and W is a weighting factor which may change with the height of the point on the surround surface. A camera coordinate system corresponding to an image means a camera coordinate system established when the image is being captured. Based on Equation (2), the world coordinates of the point may be transformed into corresponding camera coordinates. Therefore, a pixel corresponding to the point may be identified on the image based on the camera coordinates and camera intrinsic parameters such as focus length. Thereafter, the pixel may be projected onto the point.

In some embodiments, the weighting factor W may be equal to 0 when the height of the point is larger than a height of the origin of the world coordinate system, may be greater than 0 and less than 1 when the height of the point is not larger than the height of the origin, and may be equal to 1 when the height of the point is 0. In some embodiments, the weighting factor W may reduce with the increasing of the height of the point when the height of the point is not greater than that of the world coordinate system's origin. In some embodiments, the weighting factor W may be calculated based on Equation (4):

$$W = \frac{H_0 - H_1}{H_0} \qquad \text{Equation (4)}$$

where $H_0$ stands for the height of the origin of the world coordinate system and $H_1$ stands for the height of the point. As a result, an improved surround view of the ground plane and objects near the ground plane may be obtained.

According to one embodiment of the present disclosure, a system for generating a surround view is provided. The system may include a processing device configured to: establish a surround surface; obtain a plurality of images of surroundings; and project the images onto the surround surface based on a projection relationship between points on the surround surface and pixels on the images to generate a surround view, where the projection relationship may change with heights of the points on the surround surface. And the system may include a display device for showing the surround view.

In some embodiments, the processing device may be configured to obtain the projection relationship between one of the images and the surround surface based on Equation (3):

$$\begin{bmatrix} X_c \\ Y_c \\ Z_c \end{bmatrix} = R \begin{bmatrix} X_w \\ Y_w \\ Z_w \end{bmatrix} + WT \qquad \text{Equation (3)}$$

where $X_w$, $Y_w$, and $Z_w$ are world coordinates of a point on the surround surface in a world coordinate system, $X_c$, $Y_c$ and $Z_c$ are camera coordinates of the point in a camera coordinate system corresponding to the image, R stands for a rotation matrix from the world coordinate system to the camera coordinate system, T stands for a translation matrix from the world coordinate system to the camera coordinate system, and W is a weighting factor which may change with the height of the point on the surround surface.

In some embodiments, the weighting factor W may be equal to 0 when the height of the point is larger than a height of the origin of the world coordinate system, may be greater than 0 and less than 1 when the height of the point is not larger than the height of the origin, and may be equal to 1 when the height of the point is 0. In some embodiments, the weighting factor W may reduce with the increasing of the height of the point when the height of the point is not greater than that of the world coordinate system's origin. In some embodiments, the weighting factor W may be calculated based on Equation (4):

$$W = \frac{H_0 - H_1}{H_0} \qquad \text{Equation (4)}$$

where $H_0$ stands for the height of the origin of the world coordinate system and $H_1$ stands for the height of the point.

In some embodiments, the system may include a plurality of cameras for capturing the images of surroundings.

By employing a method or system of the present disclosure, distortions may be corrected to a certain extent, especially for the surround view of the ground plane.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1:
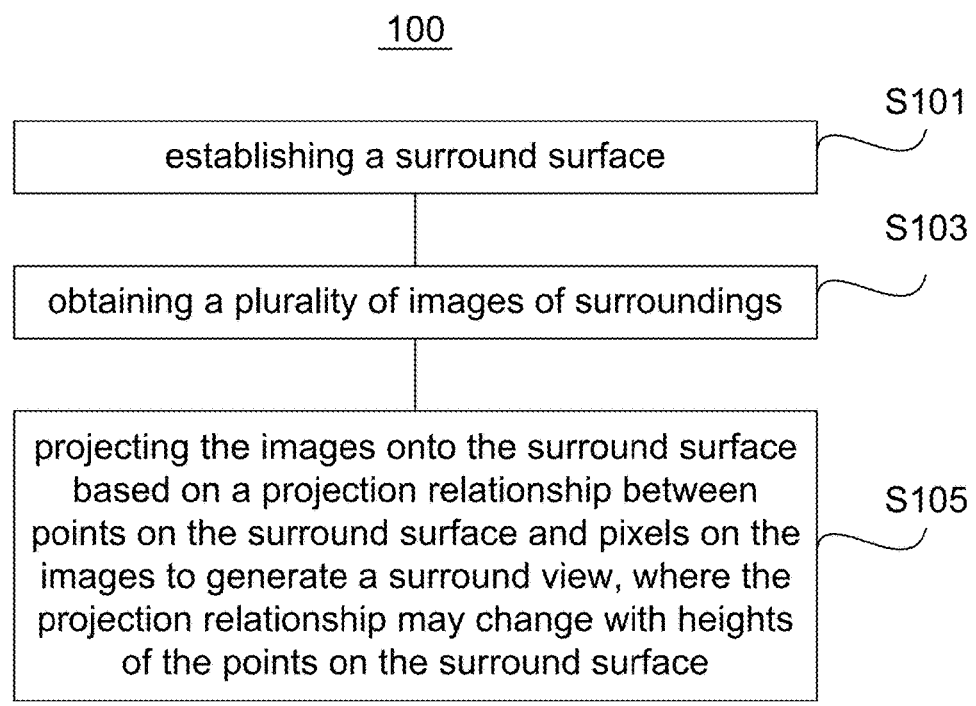
FIG. 1 illustrates a schematic flow chart of a method 100 for generating a surround view according to one embodiment of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

FIG. 1 illustrates a schematic flow chart of a method 100 for generating a surround view according to one embodiment of the present disclosure.

In S101, establishing a surround surface.

A surround surface means a simulated 3D surface with a specific shape, which may at least encompass an object around. The object may be a vehicle, a detector, or the like.

Figure 2:
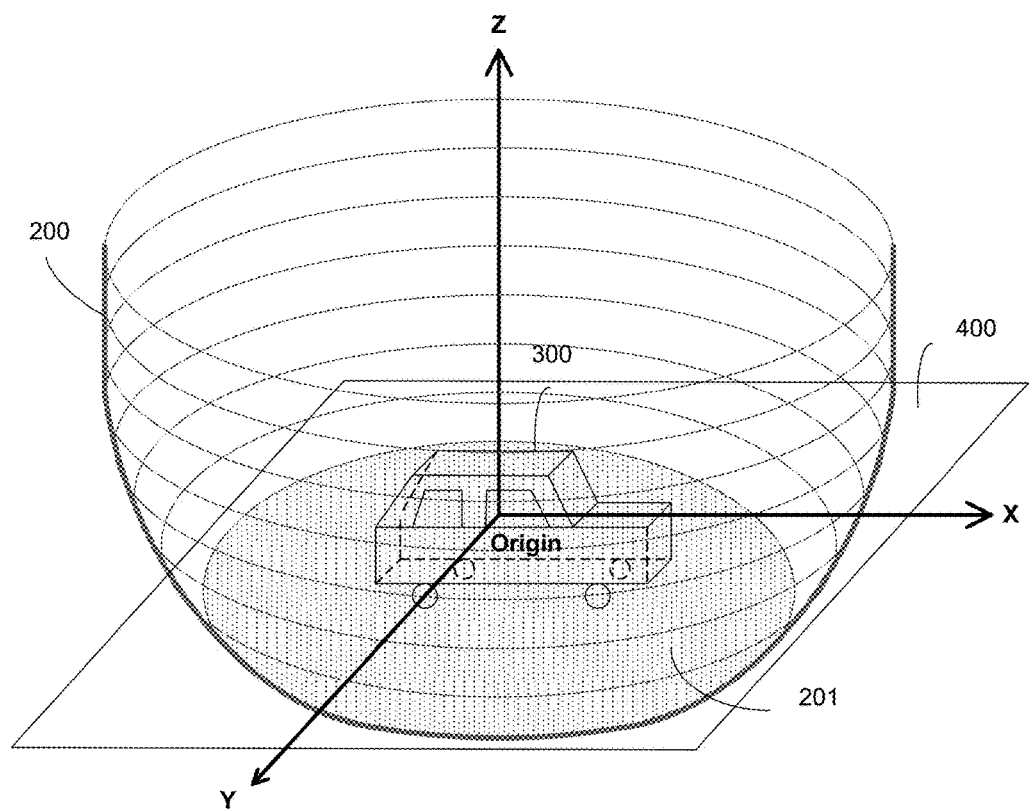
FIG. 2 schematically illustrates an example of a surround surface.

FIG. 2 schematically illustrates an example of a surround surface 200 encompassing a vehicle 300. In some embodiments, the surround surface 200 may be established with a bowl-like shape to simulate a human's field of view. Besides, the surround surface 200 may encompass the vehicle 300 from its bottom. Therefore, not only the scenery around the vehicle 300, but also obstacles on a ground plane 400 near the vehicle 300 may be projected onto the surround surface 200.

It should be noted that the specific configuration of the surround surface 200, for example, size, position, shape, and the like may be set based on practical requirements. In some embodiments, the surround surface 200 may have a bottom plane 201, which is the lowest tangent plane thereof, coincide with the ground plane 400.

The surround surface 200 may be established in a world coordinate system. Therefore, points on the surround surface 200 may have world coordinates, which may be used in the calculation for projection. In some embodiments, the origin may be a center of a vehicle, or set at a position of a driver in the vehicle. One axis of the world coordinate system may be set in parallel with the ground plane. FIG. 2 illustrates a world coordinate system. The world coordinate system is illustrated with an X axis parallel with the ground plane 400, a Z axis perpendicular to the ground plane 400 and a Y axis perpendicular to X and Z axes. Such configuration of the world coordinate system, which is not limiting, is well known in the art and will not be described in detail here.

In S103, obtaining a plurality of images of surroundings.

"Images of surroundings" means that the images may include the scenery encompassing the vehicle 300. In some embodiments, the images may be captured by a plurality of cameras orientating in different directions. In some embodiments, the cameras may be fish eye cameras with a field of view of about 190°, therefore, it is needed at least two fish eye cameras, preferably but not limiting, four fish eye cameras.

In S105, projecting the images onto the surround surface 200 based on a projection relationship between points on the surround surface 200 and pixels on the images, where the projection relationship may change with heights of the points on the surround surface 200.

Figure 3:
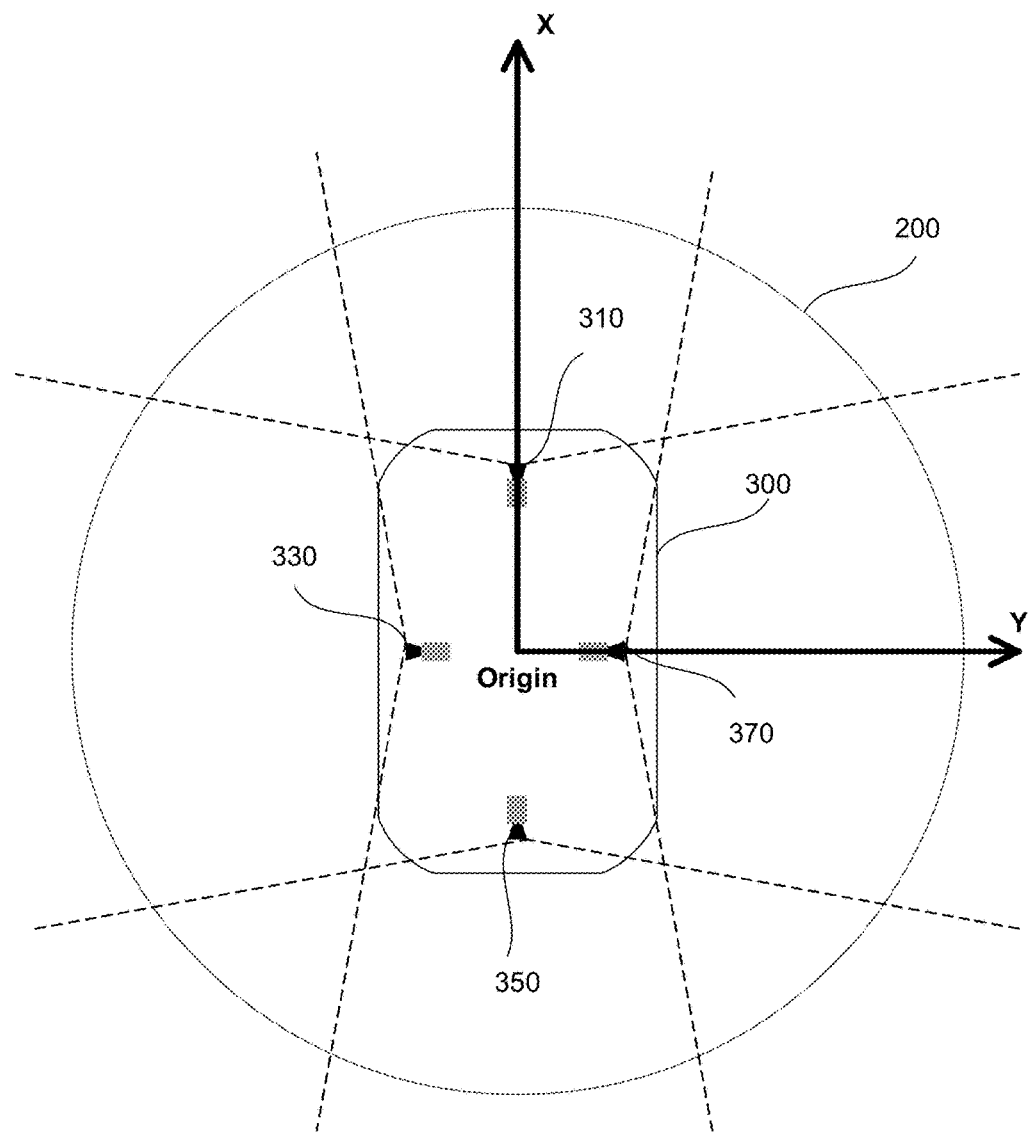
FIG. 3 schematically illustrates a cross-sectional view along X-Y plane of the vehicle and surround surface illustrated in FIG. 2.
Figure 4A:
FIGS. 4A to 4D illustrate four images of surroundings, respectively showing a front, a left, a rear and a right field of view of a vehicle.
Figure 4B:
Figure 4C:
Figure 4D:
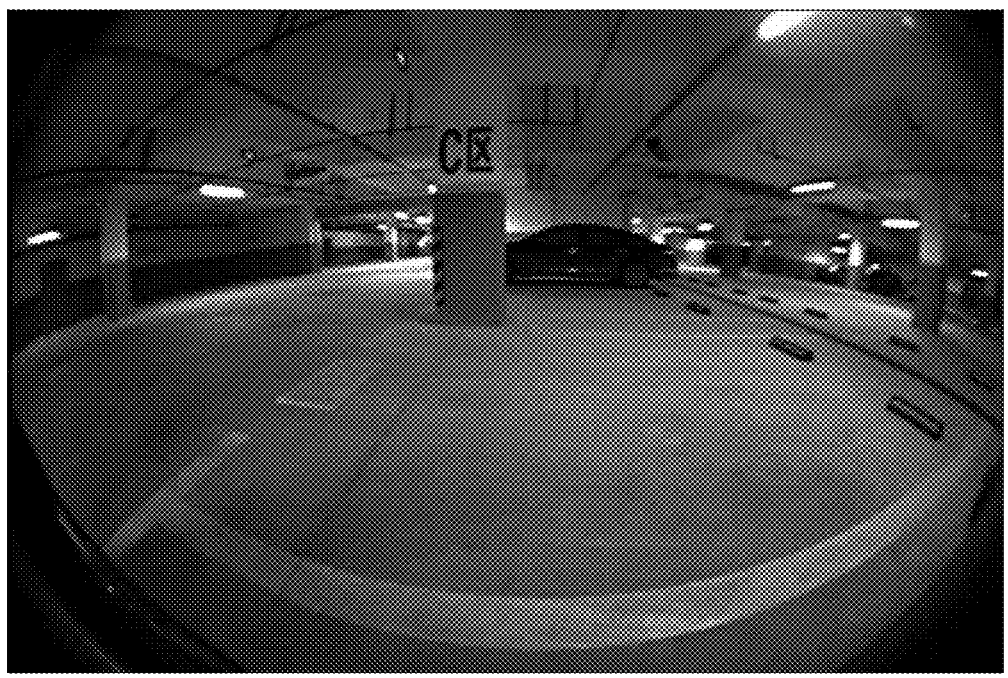

FIG. 3 schematically illustrates a cross-sectional view along X-Y plane of the vehicle 300 and the surround surface 200 illustrated in FIG. 2. As shown in FIG. 3, in some embodiments, four cameras 310, 330, 350 and 370 may be mounted on the vehicle 300 at different positions, respectively facing the front, left, rear and right directions. Four images captured by the four cameras may be projected onto the surround surface 200. It should be noted that the four images may be projected onto corresponding parts of the surround surface, respectively. A corresponding part means a part on the surround surface 200 within a field of view of a camera. However, the fields of view may overlap, generating "transition zones". The surround surface 200 within the transition zone of two cameras may be classified into the corresponding part of either camera, or divided according to a ratio, which may not be described hereunder.

FIGS. 4A to 4D illustrate four images of surroundings, respectively showing a front, a left, a rear and a right field of view of the vehicle 300.

In some embodiments, extrinsic transformation and intrinsic transformation may be applied to establish a projection relationship between points on the surround surface 200 and pixels on the images.

In existing solutions, extrinsic transformation may be performed based on Equation (1):

$$\begin{bmatrix} X_c \\ Y_c \\ Z_c \end{bmatrix} = R \begin{bmatrix} X_w \\ Y_w \\ Z_w \end{bmatrix} + T \qquad \text{Equation (1)}$$

where $X_w$, $Y_w$, and $Z_w$ are world coordinates of a point on the surround surface 200, $X_c$, $Y_c$, and $Z_c$ are camera coordinates of the point in a corresponding camera coordinate system, R stands for a rotation matrix from the world coordinate system to the camera coordinate system and T stands for a translation matrix from the world coordinate system to the camera coordinate system.

The camera coordinate system may be established based on position of the camera's optical center and direction of its optical axis. Rotation matrix, translation matrix and configuration of the camera coordinate system are well known in the art, and will not be described in detail hereunder.

Therefore, the point's world coordinates may be transformed into camera coordinates. Thereafter, in intrinsic transformation, the camera coordinates may be transformed into image coordinates, which may be relevant to the camera's intrinsic parameters such as focus length. As a result, a pixel corresponding to the point may be identified in the image and then projected onto the point.

Figure 5:
FIG. 5 illustrates a surround view generated by projecting FIGS. 4A to 4D onto the surround surface based on existing solutions.

However, based on the extrinsic and intrinsic transformation, distortion may occur. FIG. 5 illustrates a surround view generated by projecting FIGS. 4A to 4D onto the surround surface 200 based on the existing solutions. It could be seen that some regions are ideally projected, but some regions are twisted. That is because influence of the translation matrix T varies in different regions on the images, however, the pixels on the images are projected onto the surround surface 200 based on a same projection relationship.

Figure 6:
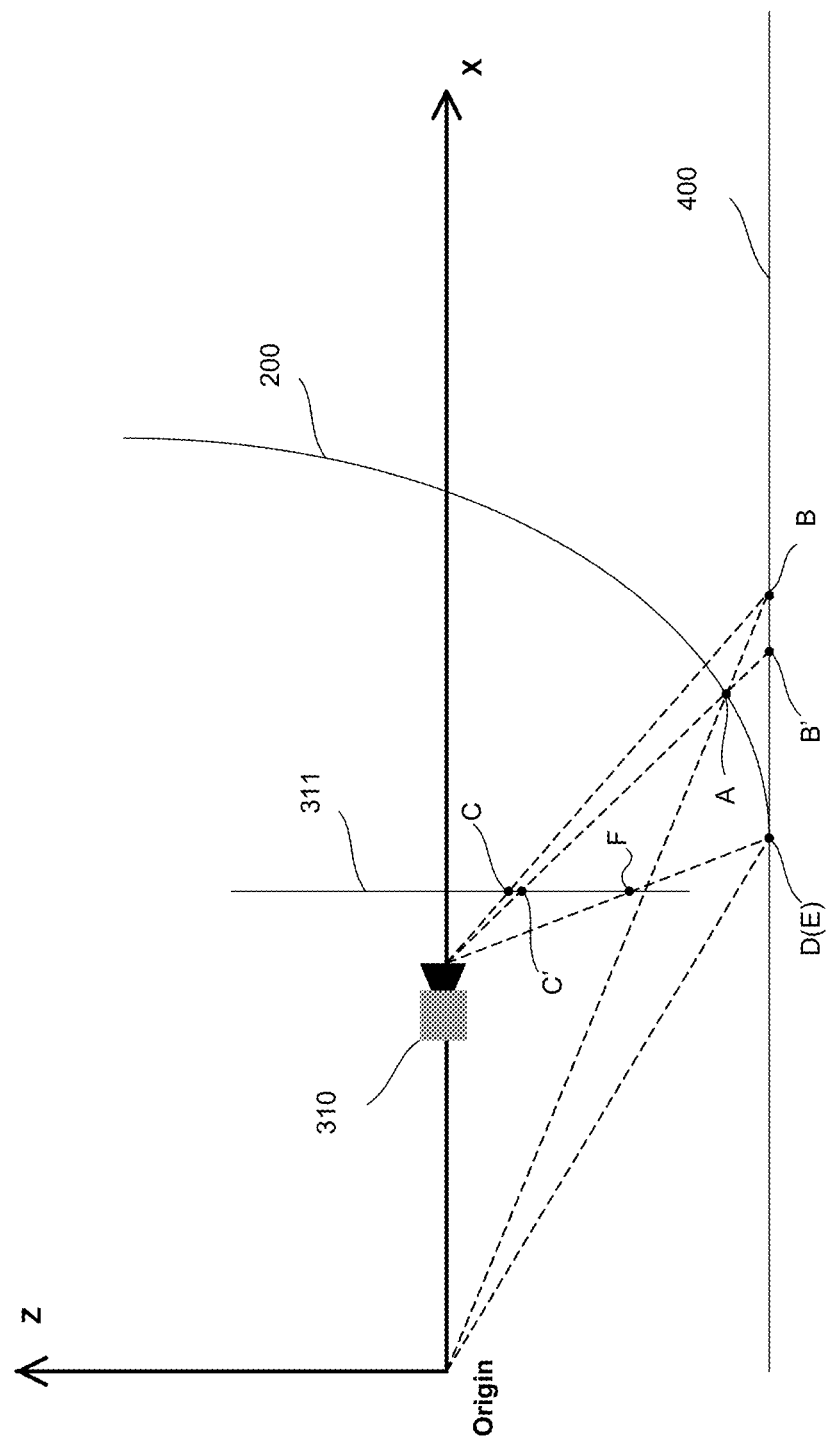
FIG. 6 schematically illustrates a cross-sectional view along X-Z plane of the vehicle and surround surface.

Specifically, the influence of the translation matrix T will be illustrated with reference to FIG. 6. FIG. 6 schematically illustrates a cross-sectional view along X-Z plane of the vehicle 300 and the surround surface 200. Referring to FIG. 6, for convenience sake, the front camera 310 may be set at a position on the X axis, the optical axis of the front camera 310 may be set in parallel with the X axis, and the image captured by the front camera 310 may include only the ground plane 400. Therefore, the rotation and translation matrices may be:

$$R = 1 \qquad \text{Equation (2)}$$
$$T = \begin{bmatrix} -N \\ 0 \\ 0 \end{bmatrix}$$

where N stands for a distance from the origin of the world coordinate system to the optical center of the front camera 310, i.e., the origin of the camera coordinate system.

The surround view is proposed to simulate a human's field of sight. Ideally, a point B on the ground plane 400 should be projected onto a point A on the surround surface 200, as the origin of the world coordinate system, the point A and the point B are in a same straight line. Therefore, a pixel C on an image 311 of the front camera 310 should be projected onto the point A. However, based on conventional Equation (1), a pixel C' on the image 311, corresponding to a point B' on the ground plane 400, may be projected onto the point A, as the camera's optical center, the pixel C', the point A and the point B' are in a same straight line.

For a point D on the lowest tangent plane of the surround surface 200, ideally, a point E on the ground plane 400 should be illustrated on the point D. Since normally the lowest tangent plane may be configured to coincide with the ground plane 400, the point D and the point E are at the same position. As a result, a pixel F on the image, corresponding to the point E may be projected onto the point D based on Equation (1).

In light of above, the ground region near the vehicle 300, within the coincident region with the lowest tangent plane of the surround surface 200, may be correctly projected in the surround view. However, scenery farther away may be twisted.

Therefore, the projection relationship needs adjustment. In some embodiments, the projection relationship may change with heights of the points on the surround surface 200. The height is calculated from the bottom surface of the surround surface 200, or the lowest tangent plane of the surround surface has no bottom surface.

In some embodiments, the projection relationship may be calculated based on Equation (3):

$$\begin{bmatrix} X_c \\ Y_c \\ Z_c \end{bmatrix} = R \begin{bmatrix} X_w \\ Y_w \\ Z_w \end{bmatrix} + WT \qquad \text{Equation (3)}$$

where a weighting factor W, which may change with heights of the points on the surround surface 200, is introduced into Equation (3) to adjust the projection relationship.

Normally, on higher regions on the surround surface 200, scenery which is far away from the vehicle 300 may be illustrated. And the translation matrix T may have less influence on farther scenery. Therefore, in some embodiments, the weighting factor W may reduce along with the increasing of the height of the point on the surround surface 200.

Specifically, in some embodiments, the weighting factor W may be equal to 0 when the height of the point is greater than the height of the origin of the world coordinate system. Normally, the height of the origin may be configured the same as the installation height of the camera. Therefore, these points (higher than the origin of the world coordinate system) may stand for the sceneries on high, for example, the sky or building far away. Basically, the translation matrix T has no influence on these sceneries. Therefore, the weighting factor W may be determined to be zero.

In some embodiments, the weighting factor W may be equal to 1 when the height of the point is 0. These points (with heights being 0) generally stand for the ground region near the vehicle 300. The translation matrix T has the greatest influence on the points. Therefore, the weighting factor W may be determined to be 1.

In some embodiments, the weighting factor W may be greater than 0 and less than 1 when the height of the point is not greater than the height of the origin. These points may stand for obstacles around the vehicle 300. In some embodiments, the weighting factor W may be a constant for these points. In some embodiments, the weighting factor W may reduce along with the increasing of the height of the points.

In some embodiments, the weighting factor W may be calculated based on Equation (4):

$$W = \frac{H_0 - H_1}{H_0} \quad \text{Equation (4)}$$

where $H_0$ stands for the height of the origin of the world coordinate system and $H_1$ stands for the height of the point on the surround surface 200. Therefore, for these points higher than bottom surface of the surround surface 200 but lower than the origin of the world coordinate system, the projection relationship may be obtained based on Equation (5).

$$\begin{bmatrix} X_c \\ Y_c \\ Z_c \end{bmatrix} = R \begin{bmatrix} X_w \\ Y_w \\ Z_w \end{bmatrix} + \frac{H_0 - H_1}{H_0} T \quad \text{Equation (5)}$$

Figure 7:
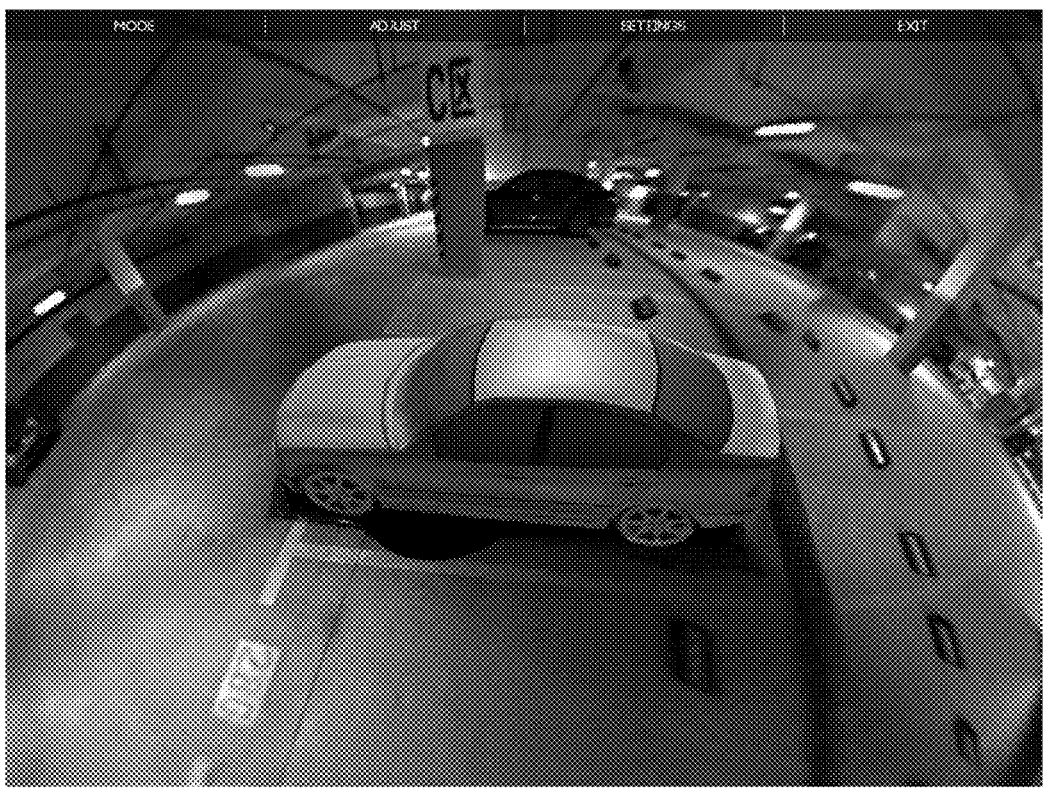
FIG. 7 illustrates a surround view generated by projecting FIGS. 4A to 4D based on a projection relationship according to one embodiment of the present disclosure.

By employing the above described method, distortion may be reduced, especially for the ground plane 400 and obstacles near the vehicle 300. FIG. 7 illustrates a surround view generated by projecting FIGS. 4A to 4D based on the above described adjusted projection relationship.

Figure 8:
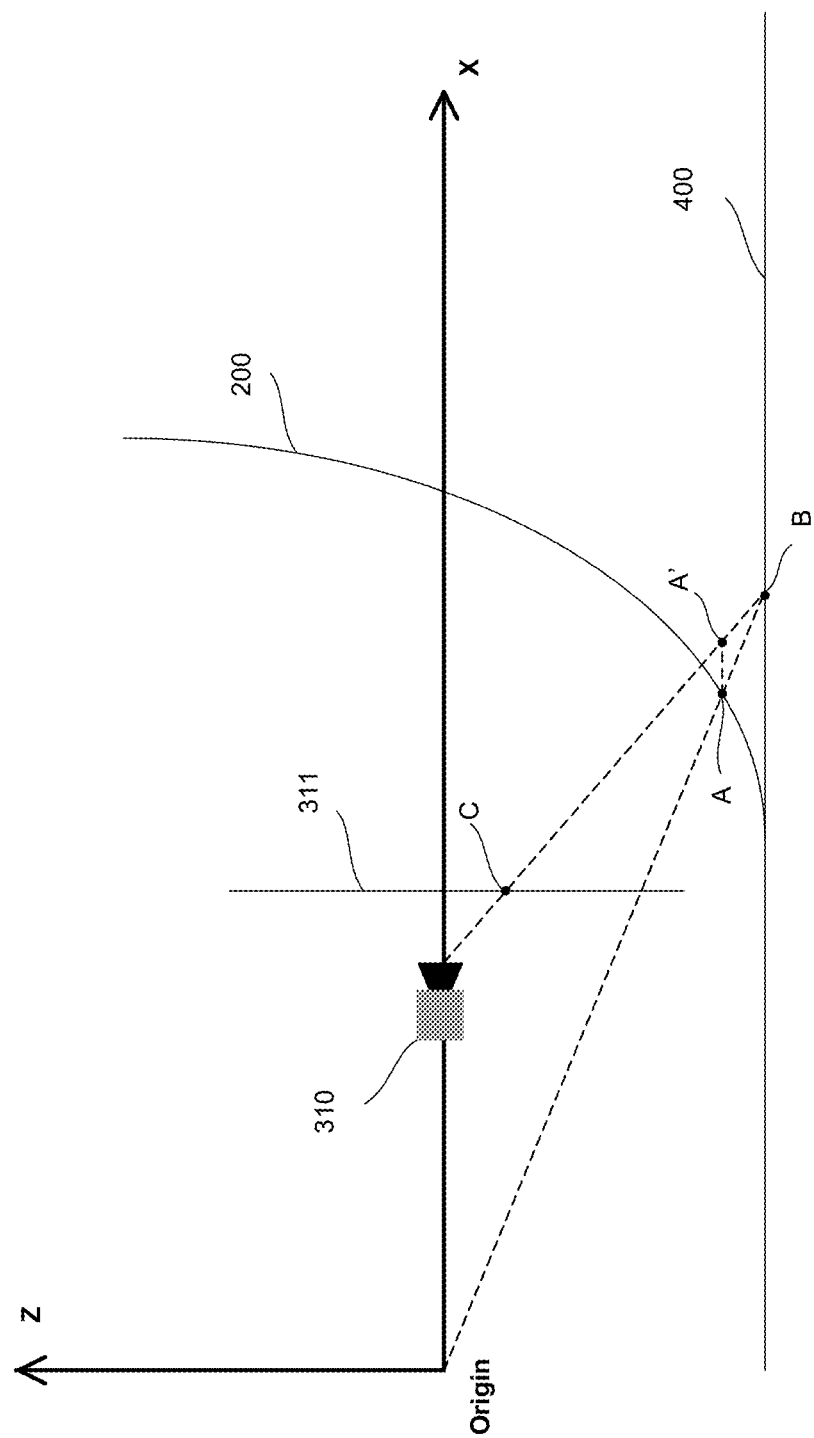
FIG. 8 schematically illustrates a projection of point A in FIG. 6 based on a projection relationship according to one embodiment of the present disclosure.

A derivation process of Equation (4) is also provided with reference to FIG. 8

FIG. 8 schematically illustrates a projection of the point A in FIG. 6 based on the adjusted projection relationship. Referring to FIG. 8, after transformation from the world coordinates to the camera coordinates based on Equation (3), if the corresponding camera coordinates of the point A may represent a virtual point A' and the virtual point A' is in the same line with the camera's optical center and the point B on the ground plane 400, the pixel C on the image corresponding to the point B on the ground plane 400 may be ideally projected onto the point A on the surround surface 200.

Suppose the point A translates a distance M along X axis to the virtual point A' as a result of transformation based on Equation (3), put world coordinates of the point A, camera coordinates of the point A', the rotation matrix and the translation matrix into Equation (3), thereby Equation (6) is obtained.

$$\begin{bmatrix} x - N + M \\ 0 \\ H_1 - H_0 \end{bmatrix} = 1 * \begin{bmatrix} x \\ 0 \\ H_1 - H_0 \end{bmatrix} + W * \begin{bmatrix} -N \\ 0 \\ 0 \end{bmatrix} \quad \text{Equation (6)}$$

Solve Equation (6) with a constraint Equation (7) obtained based on the geometric relationship of lines in FIG. 8, $$\frac{N}{M} = \frac{H_1}{H_0} \quad \text{Equation (7)}$$

Equation (4) may be calculated.

$$W = \frac{H_0 - H_1}{H_0} \quad \text{Equation (4)}$$

According to one embodiment of the present disclosure, a system for generating a surround view is provided. The system may include: a plurality of cameras adapted for capturing images of surroundings; a processing device configured to conduct S101 to S105 of method 100 to generate a surround view; and a display device adapted for showing the surround view. The system may be mounted on a vehicle 300, a detector, or the like.

There is little distinction left between hardware and software implementations of aspects of systems; the use of hardware or software is generally a design choice representing cost vs. efficiency tradeoffs. For example, if an implementer determines that speed and accuracy are paramount, the implementer may opt for a mainly hardware and/or firmware vehicle 300; if flexibility is paramount, the implementer may opt for a mainly software implementation; or, yet again alternatively, the implementer may opt for some combination of hardware, software, and/or firmware.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method for generating a surround view, comprising:
   establishing a surround surface;
   obtaining one or more images of surroundings; and
   generating a surround view by projecting the one or more images onto the surround surface based on a projection relationship between a point on the surround surface and a pixel on the images, wherein the projection relationship changes with a height of the point on the surround surface from a bottom surface of the surround surface, and wherein the projection relationship is derived at least by applying a translation matrix from a world coordinate system to a camera coordinate system, where the translation matrix used for each projected pixel is weighted differently based on a height of the projected pixel,
   wherein the projection relationship is obtained based on an equation:

$$\begin{bmatrix} X_c \\ Y_c \\ Z_c \end{bmatrix} = R \begin{bmatrix} X_w \\ Y_w \\ Z_w \end{bmatrix} + WT$$

where $X_w$, $Y_w$, and $Z_w$ are world coordinates of the point on the surround surface in the world coordinate system, $X_c$, $Y_c$, and $Z_c$ are camera coordinates of the pixel in the camera coordinate system corresponding to the image, R stands for a rotation matrix from the world coordinate system to the camera coordinate system, T stands for the translation matrix from the world coordinate system to the camera coordinate system, and W is a weighting factor based on the height of the point on the surround surface, and
   wherein the weighting factor W is determined based on an equation:

$$W = \frac{H_0 - H_1}{H_0}$$

where $H_0$ stands for a height of an origin of the world coordinate system and $H_1$ stands for the height of the point.

2. The method according to claim 1, wherein the weighting factor W is equal to 1 when the height of the point relative to the bottom surface or a lowest tangent plane of the surround surface is equal to 0.

3. The method according to claim 1, wherein the weighting factor W is equal to 0 when the height of the point is greater than a height of the origin of the world coordinate system from the bottom surface of the surround surface.

4. The method according to claim 1, wherein the weighting factor W is greater than 0 and less than 1 when the height of the point is between 0 and the height of the origin of the world coordinate system.

5. The method according to claim 4, wherein the weighting factor W reduces with increasing of the height of the point.

6. A system for generating a surround view, comprising:
   a processing device, configured to:
      establish a surround surface,
      obtain one or more images of surroundings, and
      project the one or more images onto the surround surface based on a projection relationship between a point on the surround surface and a pixel on the images to generate a surround view, where the projection relationship changes with a height of the point on the surround surface from a bottom surface of the surround surface, wherein the projection relationship is derived at least by applying a translation matrix from a world coordinate system to a camera coordinate system, where the translation matrix used for each projected pixel is weighted differently based on a height of the projected pixel; and
   a display device for showing the surround view,
   wherein the projection relationship between the images and the surround surface is obtained based on an equation:

$$\begin{bmatrix} X_c \\ Y_c \\ Z_c \end{bmatrix} = R \begin{bmatrix} X_w \\ Y_w \\ Z_w \end{bmatrix} + WT$$

where $X_w$, $Y_w$, and $Z_w$ are world coordinates of the point on the surround surface in the world coordinate system, $X_c$, $Y_c$, and $Z_c$ are camera coordinates of the pixel in the camera coordinate system corresponding to the image, R stands for a rotation matrix from the world coordinate system to the camera coordinate system, T stands for the translation matrix from the world coordinate system to the camera coordinate system, and W is a weighting factor which changes with the height of the point on the surround surface, and
   wherein the weighting factor W changes based on an equation:

$$W = \frac{H_0 - H_1}{H_0}$$

where $H_0$ stands for a height of an origin of the world coordinate system and $H_1$ stands for the height of the point.

7. The system according to claim 6, wherein the weighting factor W is equal to 1 when the height of the point relative to a lowest tangent plane of the surround surface is equal to 0.

8. The system according to claim 6, wherein the weighting factor W is equal to 0 when the height of the point is greater than a height of the origin of the world coordinate system from the bottom surface of the surround surface.

9. The system according to claim 6, wherein the weighting factor W is greater than 0 and less than 1 when the height of the point is between 0 and the height of the origin of the world coordinate system.

10. The system according to claim 9, wherein the weighting factor W reduces with increasing of the height of the point.

11. A system for generating a surround view of an object, comprising:
   one or more cameras for acquiring one or more images of surroundings of the object, and
   a processing device, configured to:
      establish a surround surface of the object; and
      generate a surround view by projecting the one or more images onto the surround surface based on a projection relationship between a point on the surround surface in a world coordinate system and a pixel on the images in a camera coordinate system, wherein the projection relationship includes a rotation matrix and a translation matrix, and the translation matrix is weighted based on a height of the point on the surround surface from a bottom surface of the surround surface, wherein the projection relationship is derived at least by applying the translation matrix from the world coordinate system to the camera coordinate system,
   wherein the projection relationship between the images and the surround surface is obtained based on an equation:

$$\begin{bmatrix} X_c \\ Y_c \\ Z_c \end{bmatrix} = R \begin{bmatrix} X_w \\ Y_w \\ Z_w \end{bmatrix} + WT$$

where $X_w$, $Y_w$, and $Z_w$ are world coordinates of the point on the surround surface in the world coordinate system, $X_c$, $Y_c$, and $Z_c$ are camera coordinates of the pixel in the camera coordinate system corresponding to the image, R stands for the rotation matrix from the world coordinate system to the camera coordinate system, T stands for the translation matrix from the world coordinate system to the camera coordinate system, and W is a weighting factor which changes with the height of the point on the surround surface, and
   wherein the weighting factor W changes based on an equation:

$$W = \frac{H_0 - H_1}{H_0}$$

where $H_0$ stands for a height of an origin of the world coordinate system and $H_1$ stands for the height of the point.

12. The system according to claim 11, wherein the weighting factor W is equal to 1 when the height of the point relative to the bottom surface or a lowest tangent plane of the surround surface is equal to 0.

13. The system according to claim 11, wherein the weighting factor W is equal to 0 when the height of the point is greater than a height of the origin of the world coordinate system from the bottom surface of the surround surface.

14. The system according to claim 11, wherein the weighting factor W reduces with increasing of the height of the point when the height of the point is between 0 and the height of the origin of the world coordinate system.

* * * * *